United States Patent [19]

Takimoto et al.

[11] Patent Number: 5,478,384
[45] Date of Patent: Dec. 26, 1995

[54] RECORDING LIQUID

[75] Inventors: Hiroshi Takimoto; Tomio Yoneyama; Hideo Sano; Yukichi Murata, all of Kanagawa; Masahiro Yamada, Tokyo, all of Japan

[73] Assignee: Mitsubishi Kasei Corporation, Tokyo, Japan

[21] Appl. No.: 238,734

[22] Filed: May 5, 1994

[30] Foreign Application Priority Data

| Nov. 7, 1991 | [JP] | Japan | 3-291770 |
| May 29, 1992 | [JP] | Japan | 4-138808 |
| May 29, 1992 | [JP] | Japan | 4-138809 |

[51] Int. Cl.$^6$ .................................................. C09D 11/02
[52] U.S. Cl. ................................. 106/22 K; 534/680
[58] Field of Search ............................... 106/22 K; 534/680

[56] References Cited

U.S. PATENT DOCUMENTS

| 4,752,337 | 6/1988 | Kunde | 106/22 K |
| 5,062,893 | 11/1991 | Adamic et al. | 106/22 K |
| 5,198,022 | 3/1993 | Aulick et al. | 106/22 K |
| 5,256,194 | 10/1993 | Nishiwaki et al. | 106/22 K |
| 5,281,263 | 1/1994 | Gregory et al. | 106/22 K |

FOREIGN PATENT DOCUMENTS

| 0422668 | 4/1991 | European Pat. Off. | 106/22 K |
| 049536 | 7/1992 | European Pat. Off. | 106/22 K |
| 3619573 | 12/1986 | Germany | 106/22 K |
| 174459 | 10/1983 | Japan | 106/22 K |
| 079227 | 3/1989 | Japan | 106/22 K |
| 57865 | 2/1992 | Japan | 106/22 K |
| 09192 | 5/1993 | WIPO | 106/22 K |

*Primary Examiner*—Helene Klemanski
*Attorney, Agent, or Firm*—Sughrue, Mion, Zinn, Macpeak & Seas

[57] ABSTRACT

A recording liquid excellent in print quality, light resistance, and water resistance which is characterized in that it contains an aqueous medium and at least one dye selected from the dyes represented by general formulae [I] to [V]:

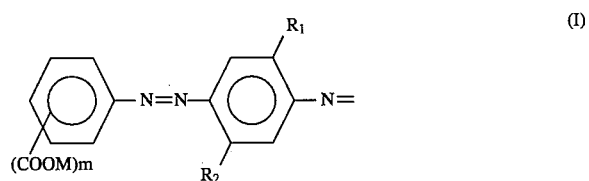

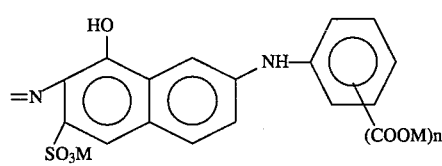

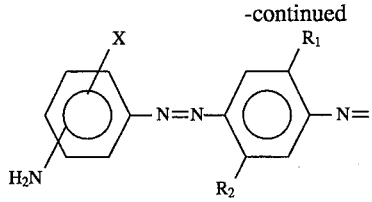

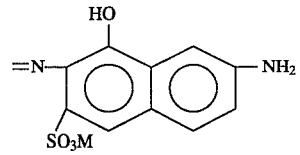

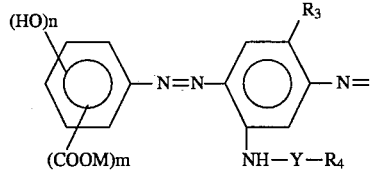

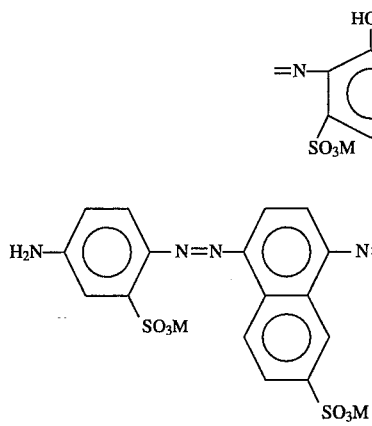

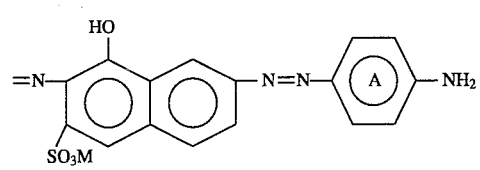

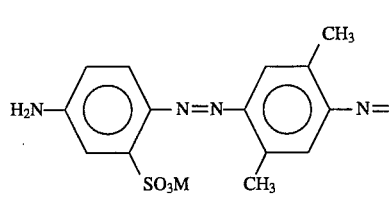

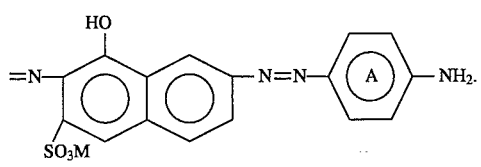

(Abstract continued on next page.)

(wherein $R_1$ and $R_2$ each represents H, $CH_3$, or $OCH_3$; $R_3$ represents H, Cl, $CH_3$, or $OCH_3$; $R_4$ represents an alkyl group having 1 to 6 carbon atoms, a phenyl group, a tolyl group, or an anisyl group; $R_5$ represents H, a phenyl group which may be substituted with a COOM group, or an alkyl group having 1 to 3 carbon atoms which is substituted with a COOM group; $R_6$ represents H or an alkyl group having 1 to 3 carbon atoms which is substituted with a COOM group; X represents $SO_3M$ or COOM; Y represents —CO— or —$SO_2$—; m represents 1 or 2; n represents 0 or 1; A represents a phenylene group which may have one or more members selected from the group consisting of an alkyl group having 1 to 4 carbon atoms, an alkoxy group having 1 to 4 carbon atoms, an amino group, a —COOM group, a hydroxyl group, an —$SO_3M$ group, and a halogen atom; and M represents an alkali metal, an ammonium group, or an organic amine salt.)

16 Claims, No Drawings

RECORDING LIQUID

TECHNICAL FIELD

The present invention relates to a recording liquid. More particularly, it relates to a recording liquid suitable for ink-jet recording.

BACKGROUND ART

The so-called ink-jet recording method has come into practical use in which droplets of a recording liquid containing a water-soluble colorant, e.g., a direct dye or an acid dye, are issued from a minute ejection orifice to conduct recording.

With respect to the recording liquid, it is required not only to be stably ejectable over a long time period and to rapidly fix to recording papers for general business use, e.g., paper for PPCs (plain-paper copiers) such as electrophotographic paper, and fanfold paper (continuous paper for computers, etc.), to give a print in which the printed characters are of good quality, that is, the printed characters are free of blurring and have clear contours, but also to be excellent in storage stability of the recording liquid. Therefore, solvents usable in the recording liquid are severely restricted.

With respect to colorants for the recording liquid, on the other hand, they are required, for example, not only to have sufficient solubility in the solvents that are restricted as described above to thereby enable the recording liquid to be stably ejected over a long time period and be stable even in long-term storage and to give printed images having high density and excellent water resistance and light resistance, but also to be produced easily and free from any problem in safety. However, it has been difficult to satisfy these many requirements simultaneously.

Although various techniques (e.g., JP-A-55-144067, JP-A-55-152747, JP-A-57-207660, JP-A-58-147470, JP-A-62-190269, JP-A-62-190271, JP-A-62-190272, JP-A-62-250082, JP-A-62-246975, JP-A-62-257971, JP-A-62-288659, JP-A-63-8463, JP-A-63-22867, JP-A-63-22874, JP-A-63-30567, JP-A-63-33484, JP-A-63-63764, JP-A-63-105079, JP-A-64-31877, JP-A-1-93389, JP-A-1-210464, JP-A-2-140270, JP-A-3-167270, JP-A-3-200882, etc.) have hence been proposed, a colorant has not been developed which sufficiently meets the performance requirements of the market and is easy to produce. (The term "JP-A" used herein means an "unexamined published Japanese patent application.")

DISCLOSURE OF THE INVENTION

An object of the present invention is to provide a black recording liquid which is good in print quality when used in ink-jet recording, writing, etc. to conduct recording on plain paper, and which gives recorded images having high density and excellent in light resistance and, in particular, in water resistance and color tone of recorded-image, and has good stability in long-term storage.

BEST MODE FOR CARRYING OUT THE INVENTION

The present inventors have ascertained that the above object is accomplished when a specific dye is used as a recording liquid component, whereby the present invention has been accomplished. That is, the spirit of the present invention resides in a recording liquid characterized in that it contains an aqueous medium and at least one dye selected from the dyes represented by general formulae [I] to [V]:

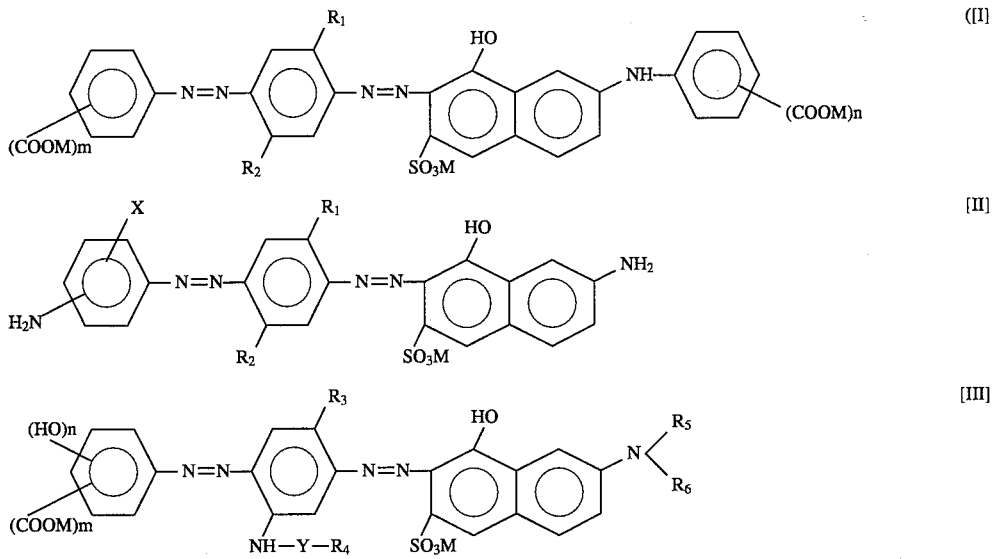

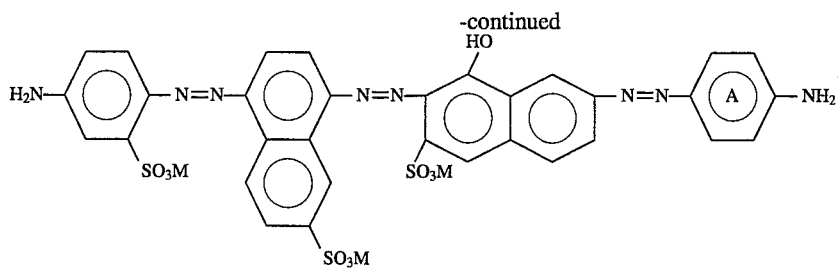

[IV]

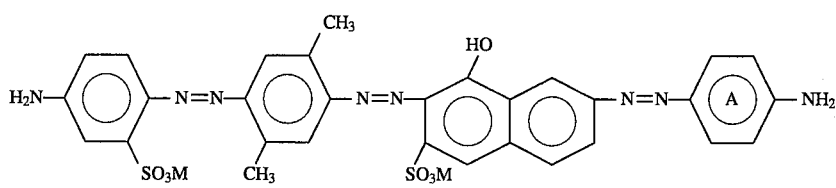

[V]

(wherein $R_1$ and $R_2$ each represents H, $CH_3$, or $OCH_3$; $R_3$ represents H, Cl, $CH_3$, or $OCH_3$; $R_4$ represents an alkyl group having 1 to 6 carbon atoms, a phenyl group, a tolyl group, or an anisyl group; $R_5$ represents H, a phenyl group which may be substituted with a COOM group, or an alkyl group having 1 to 3 carbon atoms which is substituted with a COOM group; $R_6$ represents H or an alkyl group having 1 to 3 carbon atoms which is substituted with a COOM group; X represents $SO_3M$ or COOM; Y represents —CO— or —$SO_2$—; m represents 1 or 2; n represents 0 or 1; A represents a phenylene group which may have one or more members selected from the group consisting of an alkyl group having 1 to 4 carbon atoms, an alkoxy group having 1 to 4 carbon atoms, an amino group, a —COOM group, a hydroxyl group, an —$SO_3M$ group, and a halogen atom; and M represents an alkali metal, an ammonium group, or an organic amine salt.)

The present invention will be explained below in detail.

The alkyl group having 1 to 6 carbon atoms as $R_4$ includes a methyl group, an ethyl group, a propyl group, a butyl group, a pentyl group, and a hexyl group, which each may be either linear or branched.

The alkyl group having 1 to 3 carbon atoms as $R_5$ and $R_6$ includes a methyl group, an ethyl group, and an n- and i-propyl groups.

As the substituents of the phenylene group represented by A, the alkyl group or alkoxy group each having 1 to 4 carbon atoms includes a methyl group, a methoxy group, an ethyl group, an ethoxy group, a propyl group, a propoxy group, a butyl group, and a butoxy group, which each may be either linear or branched, and the halogen atom includes a bromine atom, an iodine atom, a chlorine atom, and a fluorine atom.

These substituents for the phenylene group of A may substitute at any position. Further, the phenylene group may have not only one but also two or more such substituents. In this case, the substituents may be of the same kind or of different kinds.

Examples of the alkali metal represented by M include Na, K, Li, etc. Examples of the organic amine salt represented by M include a group in which three or four hydrogen atoms of an ammonium group have been replaced by an alkyl group having 1 to 4 carbon atoms and/or a hydroxyalkyl group having 1 to 4 carbon atoms. Additionally, the organic amine salt may be a salt of a polyalkylenepolyamine such as tetraethylenepentamine or diethylenetriamine. Preferred as the polyalkylene group is a polyethylene group.

The dyes of general formulae [I] to [V] for use in this invention each is of a black color and suitable for use as a recording liquid.

A mixture of two or more of these dyes may be used in this invention. In this case, two or more dyes which each other are identical in general formula but different in substituent may be used, or two or more dyes that differ each other in general formula may be used.

Specific examples of the dyes represented by general formula [I] include the following:

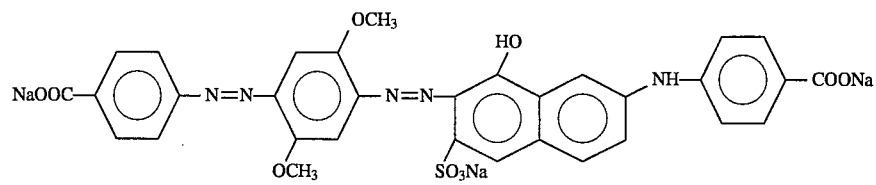

(I-1)

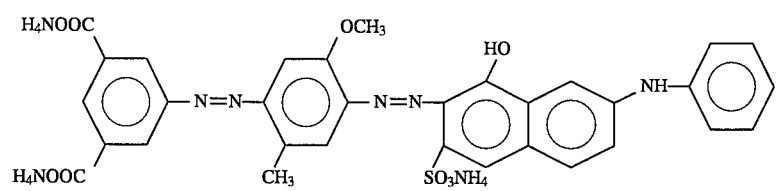

(I-2)

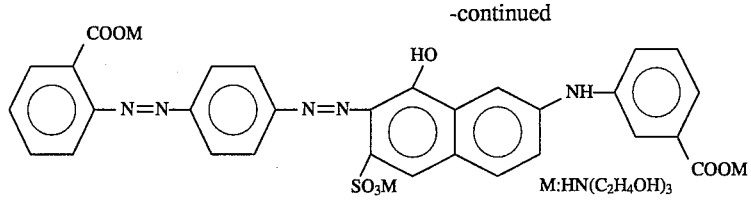
(I-3)
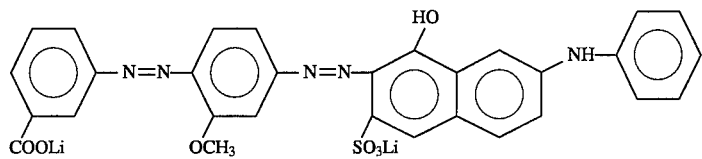
(I-4)
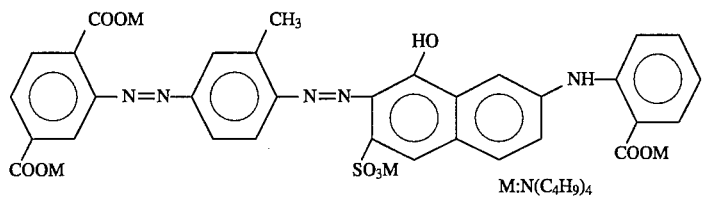
(I-5)
Specific examples of the dyes represented by general formula [II] include the following:
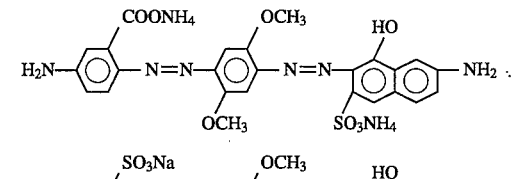
(II-1)
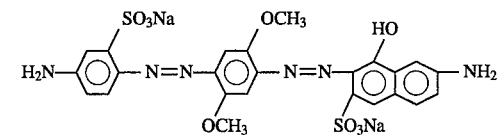
(II-2)
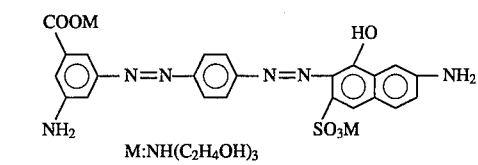
(II-3)
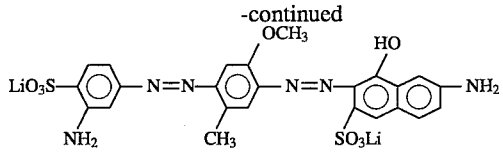
(II-4)
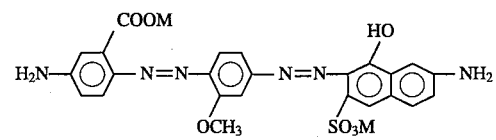
(II-5)
Specific examples of the dyes represented by general formula [III] include the following:
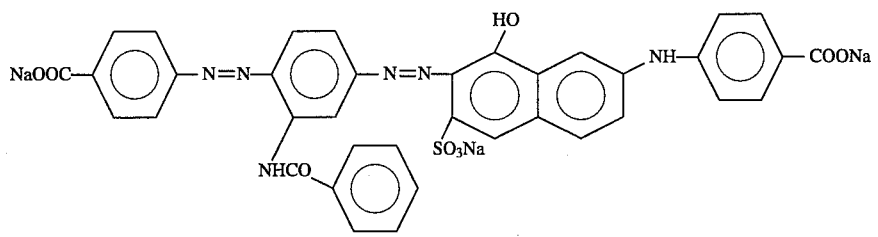
(III-1)

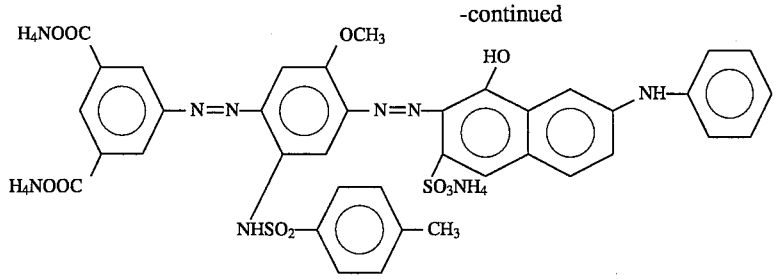
(III-2)
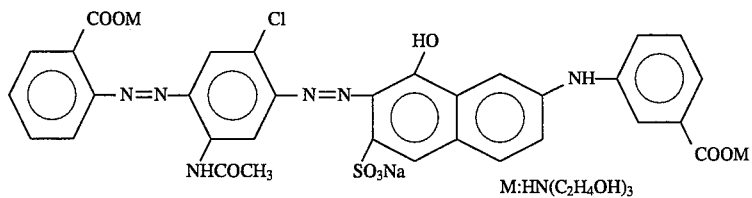
(III-3)
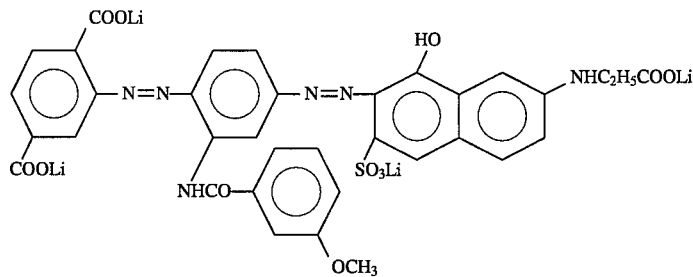
(III-4)
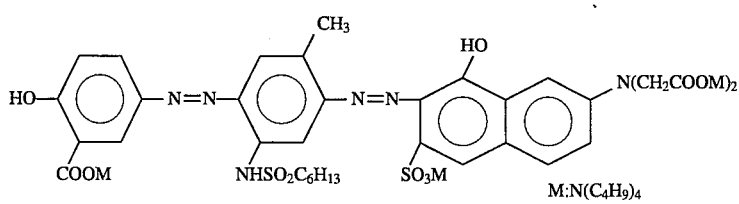
(III-5)
The dyes represented by general formula [IV] are preferably those represented by general formula [IVA].
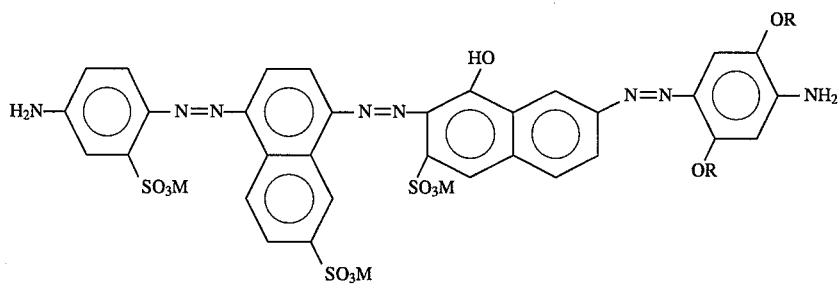
[IVA]
(wherein R represents an alkyl group having 1 to 4 carbon atoms and M is the same as defined above.)
In this invention, at least one dye, preferably at least two dyes, selected from the dyes represented by general formula [IVA] may be used.

Specific examples of the dyes represented by general formula [IV] include the following:

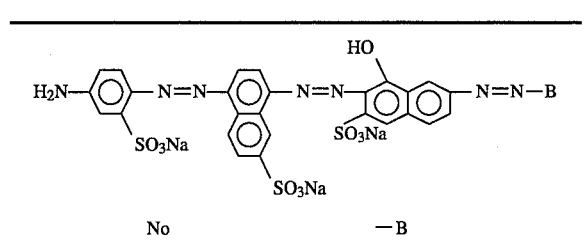

| No | —B |
|---|---|
| IV-1 | 2,5-dimethoxy-4-aminophenyl (—C₆H₂(OCH₃)₂—NH₂) |
| IV-2 | 2,5-diethoxy-4-aminophenyl |
| IV-3 | 2,5-di(n-butoxy)-4-aminophenyl |
| IV-4 | 4-aminophenyl |
| IV-5 | 2-methoxy-4-aminophenyl |
| IV-6 | 2-ethoxy-4-aminophenyl |
| IV-7 | 2,6-dimethyl-4-aminophenyl |
| IV-8 | 2,6-dimethyl-3-aminophenyl |
| IV-9 | 2,6-diethyl-4-aminophenyl |
| IV-10 | 3-(n-butyl)-4-aminophenyl |
| IV-11 | 2-methoxy-6-methyl-4-aminophenyl |

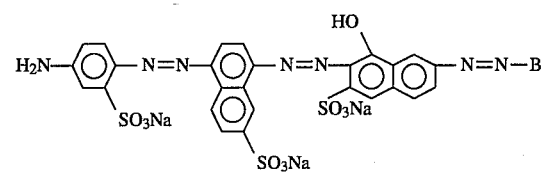

| No | —B |
|---|---|
| IV-12 | 3,4-diaminophenyl |
| IV-13 | 2-carboxylato(Na)-4-aminophenyl—NH₂ |
| IV-14 | 2-chloro-3,4-diaminophenyl |
| IV-15 | 2-hydroxy-6-methyl-4-aminophenyl |
| IV-16 | 2-methoxy-3-amino-4-aminophenyl |
| IV-17 | 2-sulfo(Na)-3-amino-4-aminophenyl |
| IV-18 | 2-methoxy-6-sulfo(Na)-4-aminophenyl |
| IV-19 | 2,6-di(n-propoxy)-4-aminophenyl |
| IV-20 | 2,6-di(iso-propoxy)-4-aminophenyl |

In addition to such dyes in a sodium salt form, examples thereof further include lithium salts thereof; ammonium salts thereof; and organic amine salts thereof, e.g., triethylamine salts, tri(n)butylamine salts, trimethylamine salts, (n)butylamine salts, ethanolamine salts, diethanolamine salts, triethanolamine salts, and tetramethylammonium salts.

The dyes represented by general formula [V] are preferably those represented by general formula [VA].

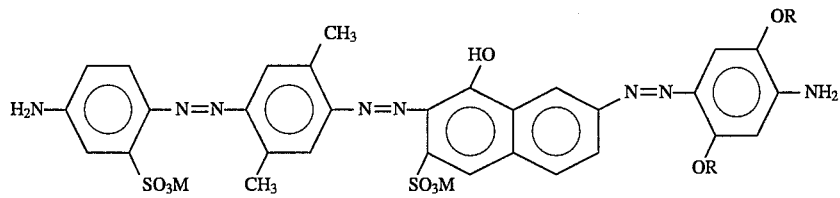

[VA]

(wherein R and M are the same as defined above.)

In this invention, at least one dye, preferably at least two dyes, selected from the dyes represented by general formula [VA] may be used.

Specific examples of the dyes represented by general formula [V] include the following:

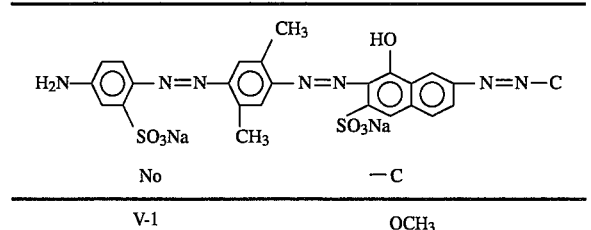

| No | —C |
|---|---|
| V-1 | 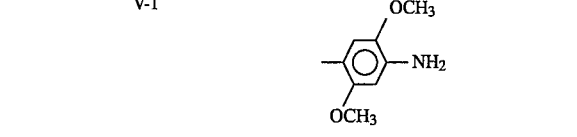 |
| V-2 | 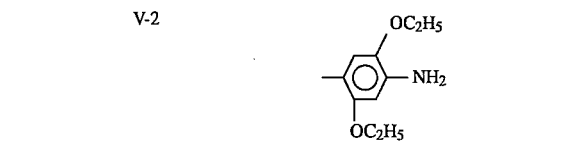 |
| V-3 | 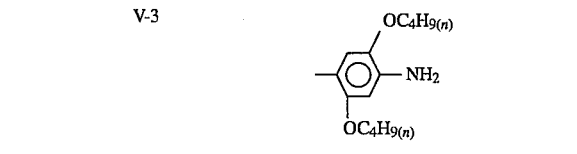 |
| V-4 | 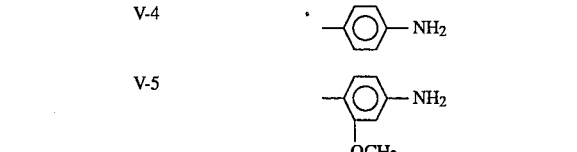 |
| V-5 | 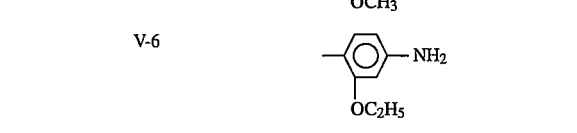 |
| V-6 | 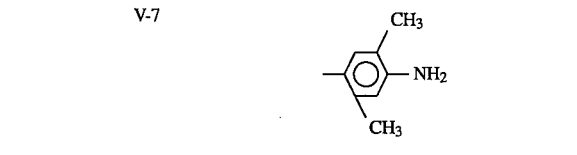 |
| V-7 | 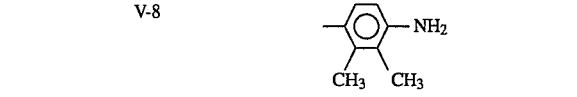 |
| V-8 | 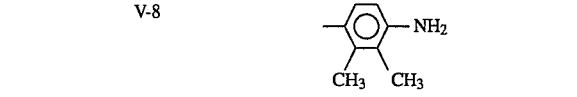 |

-continued

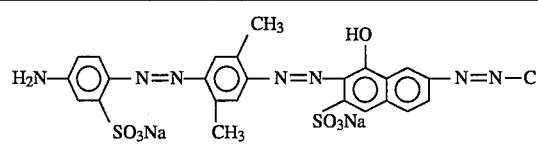

| No | —C |
|---|---|
| V-9 | 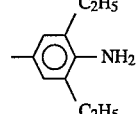 |
| V-10 | 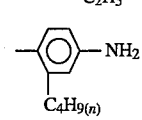 |
| V-11 | 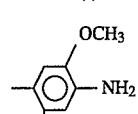 |
| V-12 | 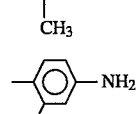 |
| V-13 | 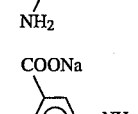 |
| V-14 | 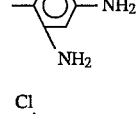 |
| V-15 | 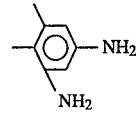 |
| V-16 | 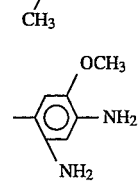 |

-continued

| No | —C |
|---|---|
| V-17 | (SO3Na, NH2, NH2 substituted phenyl) |
| V-18 | (OCH3, NH2, SO3Na substituted phenyl) |
| V-19 | (OC3H7(n), NH2, OC3H7(n) substituted phenyl) |
| V-20 | (OC3H7(i), NH2, OC3H7(i) substituted phenyl) |

Top of table structure:

H2N—⟨⟩—N=N—⟨⟩—N=N—⟨naphthyl with HO, SO3Na⟩—N=N—C
         |              |
        SO3Na          CH3 (and CH3 on other ring)

In addition to such dyes in a sodium salt form, examples thereof further include lithium salts thereof; ammonium salts thereof; and organic amine salts thereof, e.g., triethylamine salts, tri(n)butylamine salts, trimethylamine salts, (n)butylamine salts, ethanolamine salts, diethanolamine salts, triethanolamine salts, and tetramethylammonium salts.

The azo dyes represented by general formulae [I] to [V] can be produced through diazotization and coupling step according to methods which themselves are known (see, for example, *Shin Senryo Kagaku* (New Industrial Chemistry) written by Yutaka Hosoda, published by Gihodo on Dec. 21, Showa-48 (1973) pp. 396–409).

In particular, dyes represented by general formula [IV] can be produced by the following process.

That is, 2,5-diaminobenzenesulfonic acid is acetylated with acetic anhydride to obtain 2-amino-5-acetylaminobenzenesulfonic acid, which is then diazotized in an ordinary manner and coupled with 1,7-Cleve's acid to thereby obtain the compound [A] shown below.

The compound [A] is then diazotized in an ordinary manner and coupled with γ-acid to thereby obtain the compound [B] shown below.

Thereafter, the compound [B] is diazotized in an ordinary manner and coupled with an aniline compound represented by general formula [C] given below to thereby obtain a compound represented by general formula [D] given below.

Further the compound of general formula [D] is hydrolyzed using a base, e.g., caustic soda, to thereby obtain the desired compound represented by the above-described general formula [I] in which M is sodium.

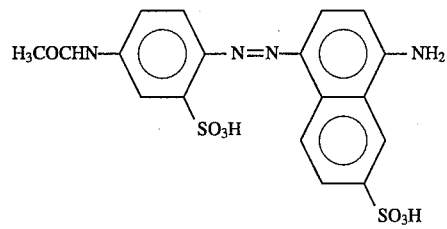

[A]

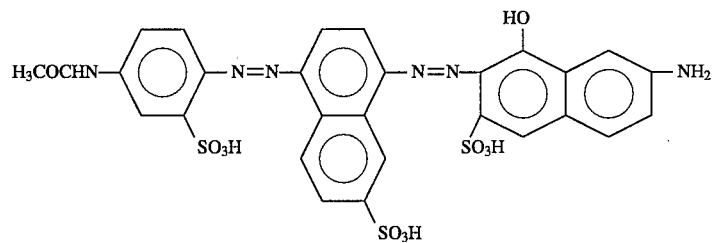

[B]

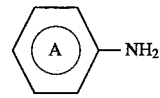

[C]

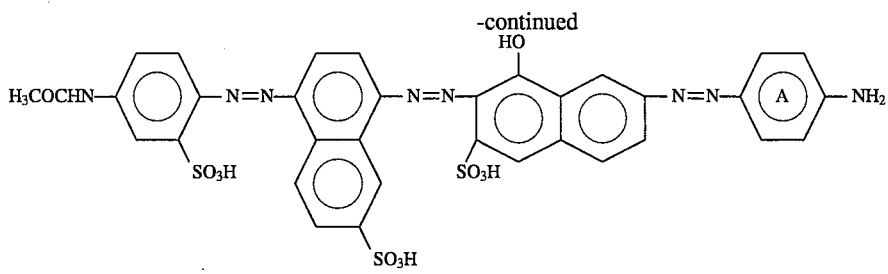

(In the structural formulae of the compounds [C] and [D] mentioned above, the benzene ring shown by A has the same meaning as in general formula [IV] described above.)

Although all the reactions described above can be conducted in an aqueous medium, an organic solvent such as dimethylformamide or N-methylpyrrolidone may be added, if desired, in order to perform the reactions at accelerated rates. The above-mentioned compounds [A], [B], and [D], serving as intermediates for obtaining the colorant of general formula [IV] of the present invention, may be taken out by filtration in the course of the process, so as to be used in the subsequent reactions. It is, however, possible to use the reaction liquid as it is in the subsequent reaction without taking out these compounds.

Since the desired dye of general formula [IV] generally separates out as crystals from the reaction liquid, the crystals may be taken out by filtration. If, however, the crystal precipitation is insufficient, the compound can be taken out by adding common salt or the like to cause salting out.

Dyes represented by general formula IV] can be produced by the following process.

That is, 2,5-diaminobenzenesulfonic acid is acetylated with acetic anhydride to obtain 2-amino-5-acetylaminobenzenesulfonic acid, which is then diazotized in an ordinary manner and coupled with 2,5-xylidine to thereby obtain the compound [E] shown below.

The compound [E] is then diazotized in an ordinary manner and coupled with γ-acid to thereby obtain the compound [F] shown below.

Thereafter, the compound [F] is diazotized in an ordinary manner and coupled with an aniline compound represented by the general formula [C] given above to thereby obtain a compound represented by general formula [G] given below.

Further the compound of general formula [G] is hydrolyzed using a base, e.g., caustic soda, to thereby obtain the desired compound represented by the above-described general formula [V] in which M is sodium.

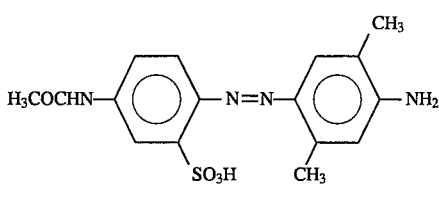

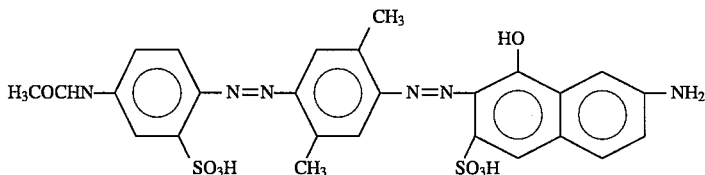

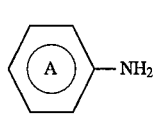

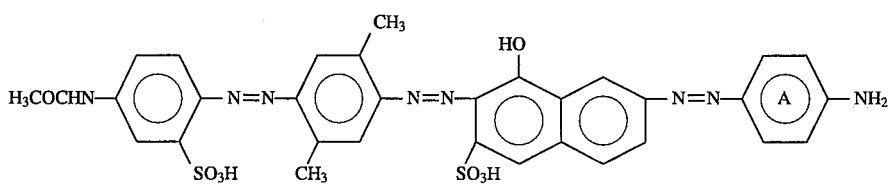

(In the structural formulae of the compounds [C] and [G] mentioned above, the benzene ring shown by A has the same meaning as in general formula [V] described above.)

By conducting the reactions and treatment in the same manner as those for the dye of general formula [IV], the dye of general formula [V] can be obtained.

In the case of using the dyes of the above-described general formulae [I] to [V] for a recording liquid, it is necessary to purify all these dyes after production. Effective means for purification include a method in which an alcohol, e.g., methanol or isopropanol, is added to an aqueous solution or suspension of a dye to crystallize out the dye, and a method in which a dye is suspended in and washed with dimethylformamide, N-methylpyrrolidone, etc. By these methods, the purity of the dye can be heightened and the inorganic salt can be removed.

By the processes described above, the dyes are obtained as sodium salts. In the case of obtaining the dye in the form of a lithium salt, for example, the desired lithium salt dye can be obtained by taking out the above-described compound [D] or [G] in the course of the process, purifying it by an operation, e.g., crystallization, to remove the common salt contained therein, and then conducting hydrolysis using lithium hydroxide in place of caustic soda. In the case of obtaining the dye in the form of an ammonium salt or organic amine salt, it can be obtained, for example, by converting the above-described sodium salt dye into a free acid form either by dissolving or suspending the sodium salt dye in water or in a mixed solvent composed of water, and a water-soluble organic solvent and then adding an acid, e.g., hydrochloric acid, to cause acid precipitation; or by passing an aqueous solution of the sodium salt through a column of an ion-exchange resin, and then reacting the resulting dye with ammonia or an organic amine in an aqueous medium.

The content of the dyes of general formulae [I] to [V] described above in the recording liquid is preferably 0.5 to 5% by weight, especially preferably 2 to 4% by weight, based on the total amount of the recording liquid.

The solvent for use in the recording liquid of the present invention is preferably water and water containing a water-soluble organic solvent which, for example, includes a glycol solvent, e.g., ethylene glycol, propylene glycol, butylene glycol, diethylene glycol, triethylene glycol, polyethylene glycol (#200), and polyethylene glycol (#400); glycerol; a pyrrolidone solvent, e.g., N-methyl-pyrrolidone, N-ethyl-pyrrolidone, and 2-pyrrolidone; 1,3-dimethyl-imidazolidinone; ethylene glycol monoallyl ether; ethylene glycol monomethyl ether; diethylene glycol monomethyl ether; dimethyl sulfoxide; thiodiglycol; etc. These water-soluble organic solvents are used usually in an amount in the range of 5 to 50% by weight based on the total amount of the recording liquid. Water is usually used in an amount in the range of 45 to 93% by weight based on the total amount of the recording liquid.

The property of quick drying after printing and print quality can be improved further by adding a compound selected from urea, thiourea, biuret, and semicarbazide to the recording liquid of this invention in an amount of 0.1 to 10% by weight, preferably 0.5 to 5% by weight, based on the total amount of the liquid, or by adding a surfactant in an amount of 0.001 to 5.0% by weight based on the total amount of the recording liquid.

In the present invention, when the dyes of the above-described general formulae [IV] and [V] are employed, it is preferred to use a composition which contains these dyes in a total amount of 2 to 5% by weight based on the weight of the recording liquid and, as the water-soluble organic solvents described above, a glycol solvent in an amount of 5 to 20% by weight and N-methylpyrrolidone or 2-pyrrolidone in an amount of 2 to 10% by weight.

POSSIBILITY OF INDUSTRIAL APPLICATION

The recording liquid of the present invention is used for ink-jet recording and in writing utensils and, when used in recording on plain paper, it gives recorded images excellent in printed-character density, light resistance, and water resistance. In addition, the recording liquid also has good storage stability.

EXAMPLES

The present invention will be explained below in more detail with respect to examples, but the invention is not construed as being limited thereto as long as it is within the spirit thereof.

EXAMPLE 1

Water was added to 25 parts by weight of ethylene glycol monoallyl ether, 22 parts by weight of ethylene glycol, and 3.5 parts by weight of the dye of (I-1) specified hereinabove to regulate the total amount to 100 parts by weight. This composition was mixed sufficiently to dissolve the dye, filtered under pressure through a Teflon filter having a pore diameter of 1 μm, and then degassed with a vacuum pump and an ultrasonic cleaning machine to prepare a recording liquid.

Using the recording liquid obtained, ink-jet recording was conducted on paper for electrophotography (manufactured by Xerox Co.) with an ink-jet printer (trade name HG-3000, manufactured by Epson Co.). Evaluations were were conducted according to the following methods (a), (b), and (c), and the results thereof are shown.
(a) Light Resistance of Recorded Image:
Using a xenon fademeter (manufactured by Suga Shikenki Co.), the recording paper was irradiated for 100 hours. After the irradiation, little discoloration or fading was observed.
(b) Water Resistance of Recorded Image:
The recording paper was immersed in water for 5 minutes and the image was examined for blurring. The blurring of the image was slight and the decrease of density was also little.
(c) Storage Stability of the Recording Liquid:
The recording liquid was placed in sealed Teflon containers. After the recording liquid was stored for 1 month at 5° C. and 60° C., it was examined for any change. Precipitation of an insoluble matter was not observed.

EXAMPLE 2

Water was added to 10 parts by weight of glycerol, 10 parts by weight of ethylene glycol, and 5 parts by weight of the dye of (I-2) specified hereinabove to regulate the total amount to 100 parts by weight. This composition was treated by the method described in Example 1 to prepare a recording liquid, and the evaluations according to (a) to (c) in Example 1 were conducted. As a result, all the evaluations gave the similar satisfactory results as in Example 1.

EXAMPLE 3

Water was added to 5 parts by weight of diethylene glycol monobutyl ether, 15 parts by weight of glycerol, and 2 parts by weight of the dye of (I-3) specified hereinabove to regulate the total amount to 100 parts by weight. This composition was treated by the method described in Example 1 to prepare a recording liquid, and the evaluations according to (a) to (c) in Example 1 were conducted. As a result, all the evaluations gave the similar satisfactory results as in Example 1.

EXAMPLES 4 AND 5

Recording liquids were prepared by the method in Example 1 except that each of the dyes of (I-4) and (I-5) specified hereinabove was used in place of the above dye of (I-1) used in Example 1, and the evaluations according to (a) to (c) in Example 1 were conducted. As a result, all the evaluations gave the similar satisfactory results as in Example 1.

EXAMPLE 6

Water was added to 22 parts by weight of diethylene glycol and 2.5 parts by weight of the dye of (II-1) specified hereinabove to regulate the total amount to 100 parts by weight. This composition was mixed sufficiently to dissolve the dye, filtered under pressure through a Teflon filter having a pore diameter of 1 μm, and then degassed with a vacuum pump and an ultrasonic cleaning machine to prepare a recording liquid.

Using the recording liquid obtained, the evaluations (a) to (c) in Example 1 were conducted. As a result, all the evaluations gave the similar satisfactory results as in Example 1.

EXAMPLE 7

A recording liquid was prepared in the same manner as in Example 2 except that 3 parts by weight of the dye of (II-2) specified hereinabove was used in place of 5 parts by weight of the above-specified dye of (I-2), and the evaluations according to (a) to (c) in Example 1 were conducted. As a result, all the evaluations gave the similar satisfactory results as in Example 1.

EXAMPLE 8

A recording liquid was prepared in the same manner as in Example 3 except that the dye of (II-3) specified hereinabove was used in place of the above-specified dye of (I-3), and the evaluations according to (a) to (c) in Example 1 were conducted. As a result, all the evaluations gave the similar satisfactory results as in Example 1.

EXAMPLES 9 AND 10

Recording liquids were prepared by the method in Example 1 using the same composition as in Example 6 except that each of the dyes of (II-4) and (II-5) specified hereinabove was used in place of the above-specified dye of (II-1) used in Example 6. The evaluations according to (a) to (c) in Example 1 were conducted. As a result, all the evaluations gave the similar satisfactory results as in Example 1.

EXAMPLE 11

A recording liquid was prepared in the same manner as in Example 1 except that the dye of (III-1) specified hereinabove was used in place of the above-specified dye of (I-1). Using the recording liquid obtained, the evaluations according to (a) to (c) in Example 1 were conducted. As a result, the similar satisfactory results as in Example 1 were obtained.

EXAMPLE 12

A recording liquid was prepared in the same manner as in Example 2 except that the dye of (III-2) specified hereinabove was used in place of the above-specified dye of (I-2), and the evaluations according to (a) to (c) in Example 1 were conducted. As a result, all the evaluations gave the similar satisfactory results as in Example 1.

EXAMPLE 13

A recording liquid was prepared in the same manner as in Example 3 except that the dye of (III-3) specified hereinabove was used in place of the above-specified dye of (I-3), and the evaluations according to (a) to (c) in Example 1 were conducted. As a result, all the evaluations gave the similar satisfactory results as in Example 1.

EXAMPLES 14 AND 15

Recording liquids were prepared by the method in Example 1 except that each of the dyes of (III-4) and (III-5) specified hereinabove was used in place of the above-specified dye of (I-1) used in Example 1, and the evaluations according to (a) to (c) in Example 1 were conducted. As a result, all the evaluations gave the similar satisfactory results as in Example 1.

EXAMPLE 16

(i) Synthesis of Compound [A]

18.8 Grams (0.1 mol) of 2,5-diaminobenzenesulfonic acid and 250 ml of water were stirred at ordinary temperature, and 10% aqueous sodium hydroxide solution was added to adjust the pH to 7.5 to dissolve the acid. To this solution was gradually added at ordinary temperature 10.2 g (0.1 mol) of acetic anhydride, and then the mixture was stirred for 2 hours. To this reaction liquid was added 31 ml of 35% hydrochloric acid, and the mixture was cooled to 0 to 5° C. 29 Grams (0.105 mol) of 25% aqueous sodium nitrite solution was gradually added to the mixture, and it was stirred at 0 ° to 5° C. for 2 hours. After the 2 hours, 10% aqueous sulfamic acid solution was added in order to remove the excess sodium nitrite to thereby prepare a first diazo liquid. Separately, a solution obtained by stirring 22.3 g (0.1 mol) of 1,7-Cleve's acid and 400 ml of water at ordinary temperature and adding 10% aqueous sodium hydroxide solution to adjust the pH to 8.0 to dissolve the acid was cooled to 0° to 5° C. and 35% hydrochloric acid was added to adjust the pH to 6.0 to 7.0. The first diazo liquid described above was added to this solution and the pH was adjusted to 3.0 to 4.0 with 10% aqueous sodium hydroxide solution. The resulting mixture was stirred at 0° to 5° C. for 4 hours. Thereafter, the mixture was filtered, 35% hydrochloric acid was added to adjust the pH to 2.0, and 40 g of sodium chloride was added thereto to cause salting out, following which the mixture was filtered to synthesize the desired compound [A].

(ii) Synthesis of Compound [B]

A paste of the compound [A] (0.1 mol) obtained in (i) above was stirred along with 1 liter of water at ordinary temperature, and 10% aqueous sodium hydroxide solution was added to adjust the pH to 8.0 to dissolve the compound. To this solution was added 40 ml of 35% hydrochloric acid, and cooled to 0° to 5° C. 29 Grams (0.105 mol) of 25% aqueous sodium nitrite solution was gradually added to the mixture, and the resulting mixture was stirred at 0° to 5° C. for 2 hours. After the 2 hours, 10% aqueous sulfamic acid solution was added in order to remove the excess sodium nitrite to thereby prepare a second diazo liquid. Separately, 23.9 g (0.1 mol) of γ-acid was stirred along with 500 ml of water at ordinary temperature, and 10% aqueous sodium hydroxide solution was added to adjust the pH to 12.0 to neutralize the solution and dissolve the acid. This solution was cooled to 0° to 5° C., and the second diazo liquid described above was gradually added, during which the pH was maintained at 11.0 to 12.0 with 10% aqueous sodium hydroxide solution. This solution was stirred at 0° to 5° C. for 2 hours, and the colorant precipitated was filtered and washed with 150 ml of 5% aqueous sodium chloride solution to synthesize compound [B].

(iii) Synthesis of Compound [D-1]

A paste of the compound [B] (0.1 mol) obtained in (ii) above was stirred along with 1 liter of water at ordinary temperature, giving a slurry. To this slurry was added 49 ml of 35% hydrochloric acid, and the mixture was cooled to 0° to 5° C. 29 Grams (0.105 mol) of 25% aqueous sodium nitrite solution was gradually added to the mixture, and the resulting mixture was stirred at 0° to 5° C. for 3 hours. After the 3 hours, 10% aqueous sulfamic acid solution was added in order to remove the excess sodium nitrite to thereby prepare a third diazo liquid. 15.3 Grams (0.1 mol) of 2,5-dimethoxyaniline (corresponding to the compound [C] described hereinabove) was heated to 60° C. along with 100 ml of water and 8.9 ml of 35% hydrochloric acid to dissolve the compound. After this solution was cooled to 0° to 5° C., the third diazo liquid described above was gradually added and the resulting mixture was stirred at 0° to 5° C. for 10 hours to synthesize compound [D-1].

(iv) Synthesis of Dye of Formula IV-1 Given Above

To the reaction liquid containing compound [D-1] which had been obtained in (iii) above were added 250 ml of N-methylpyrrolidone and 60 g of sodium hydroxide. The mixture was heated to 60° C. and stirred for 3 hours. This mixture was cooled to room temperature and then neutralized to a pH of 8.0 with 35% hydrochloric acid, and the colorant precipitated was filtered and washed with 150 ml of 5% aqueous sodium chloride solution.

A paste of this colorant was stirred along with 750 ml of water at ordinary temperature to redisperse the colorant. Thereto was added 1,500 ml of 2-propanol. The colorant precipitated was filtered and washed with 150 ml of 67% 2-propanol, and the paste obtained was dried to obtain the desired dye (IV-1).

A recording liquid was prepared from this dye in the same manner as in Example 6.

Using the recording liquid obtained, ink-jet recording was conducted on paper for electrophotography (manufactured by Xerox Co.) with an ink-jet printer (trade name HG-4000, manufactured by Epson Co.). Evaluations were conducted according to the following methods (a), (b), (c), and (d), and the results thereof are shown.

(a) Light Resistance of Recorded Image:

Using a xenon fademeter (manufactured by Suga Shikenki Co.), the recording paper was irradiated for 100 hours. After the irradiation, little discoloration or fading was observed.

(b) Water Resistance of Recorded Image:

The recording paper (print) was immersed in water for 5 minutes and the image was examined for blurring. The blurring of the recorded image was slight and the decrease of density was also as little as 2%.

Further, when the print was sprinkled with 10 ml of water and allowed to stand, it suffered no blurring and staining of the white background was not observed also.

(c) Storage Stability of the Recording Liquid:

The recording liquid was placed in sealed Teflon containers. After the recording liquid was stored for 1 month at 5° C. and 60° C., it was examined for any change. Precipitation of an insoluble matter was not observed.

(d) Ejection Stability:

Continuous ejection was conducted for 24 hours under conditions of 20° to 25° C. and 60% RH. As a result, high-quality recording was able to be performed throughout.

Further, ejection after 1-week standing was also able to be performed stably.

EXAMPLE 17

Compound [B] was synthesized in the same manner as in Example 16 and the compound [B] was diazotized. The diazo liquid obtained was subjected to a coupling reaction with m-methoxyaniline (compound [C] corresponding to the dye of IV-5 specified hereinabove). Thereafter, hydrolysis, neutralization, filtration, and suspension and washing with isopropanol were conducted in the same manner as in Example 16, followed by drying to synthesize the dye of (IV-5).

Water was added to 10 parts by weight of dimethyl sulfoxide, 10 parts by weight of ethylene glycol, and 3 parts by weight of the dye of IV-5 obtained to regulate the total amount to 100 parts by weight. This composition was treated by the method described in Example 1 to prepare a recording liquid, and the evaluation according to (a) to (d) in Example 16 were conducted. As a result, all the evaluations gave the similar satisfactory results as in Example 16.

EXAMPLE 18

The dye of (IV-7) was obtained in the same manner as in Example 17 except that 2,5-dimethylaniline was used as compound [C].

A recording liquid was prepared using this dye by the same method as in Example 3, and the evaluations according to (a) to (d) in Example 16 were conducted. As a result, all the evaluations gave the similar satisfactory results as in Example 16.

EXAMPLE 19

Compound [D-1] was synthesized in the same manner as in Example 16, and 250 ml of N-methylpyrrolidone and 60 g of lithium hydroxide were added to the reaction liquid containing the compound [D-1]. The mixture was heated to 60° C. and stirred for 3 hours. The mixture was cooled to room temperature and then neutralized to a pH of 8.0 with 35% hydrochloric acid, and the colorant precipitated was filtered and washed with 150 ml of 2-propanol.

A paste of this colorant was stirred along with 500 ml of 2-propanol at ordinary temperature for 6 hours. The colorant was thereafter filtered, washed with 200 ml of 2-propanol, and dried to obtain a dye which was the lithium salt form of the dye (IV-1) specified hereinabove. This dye was referred to as dye IV-21.

A recording liquid was prepared by the method as in Example 16 except that the colorant of (IV-21) obtained was used in place of the above-specified dye of (IV-1) used in Example 16, and the evaluations according to (a) to (d) in Example 16 were conducted. As a result, all the evaluations gave satisfactory results as in Example 16.

EXAMPLE 20

In 500 ml of water was dissolved at ordinary temperature 20 g of the colorant of (IV-1) obtained in Example 16. Thereto was added 35% hydrochloric acid to cause acid precipitation at a pH of 1 or below. The precipitate was filtered and then washed with 100 ml of water. The paste obtained was stirred at ordinary temperature along with 500 ml of water, and the mixture was neutralized to a pH of 8.0 with 28% aqueous ammonia. This reaction liquid was evaporated to dryness to synthesize a dye which was the ammonium salt form of the dye of (IV-1) specified hereinabove. This dye was referred to as dye (IV-22). The preparation and evaluations of a recording liquid were conducted in the same manner as in Example 16 using the dye of (IV-22) obtained. As a result, all the evaluations gave satisfactory results.

EXAMPLE 21

A dye having the structure of (IV-3) specified hereinabove was obtained in the same manner as in Example 17 except that 2,5-di-n-butoxyaniline was used in place of m-methoxyaniline.

Water was added to 10 parts of diethylene glycol, 5 parts of N-methylpyrrolidone, 2 parts of triethanolamine, and 2.5 parts by weight of the dye No. IV-3 obtained to regulate the total amount to 100 parts by weight. This composition was treated by the method described in Example 16 to prepare a recording liquid, and the evaluations according to (a) to (d) in Example 16 were conducted. As a result, all the evaluations gave the similar satisfactory results as in Example 16.

EXAMPLE 22

A recording liquid was prepared in the same manner as in Example 21 except that the dye of (IV-1) specified hereinabove was used in place of the dye of (IV-3), and the evaluations (a) to (d) in Example 16 were conducted. As a result, the similar satisfactory results were obtained as in Example 16.

EXAMPLES 23 TO 25

Recording liquids were prepared using the same composition and method as in Example 21 except that 2,5-diethoxyaniline (corresponding to IV-2), 2,5-di-n-propoxyaniline (corresponding to IV-19), and 2,5-di-iso-propoxyaniline (corresponding to IV-20) were used in place of the m-methoxyaniline in Example 17 to synthesize dyes respectively corresponding thereto, and each of these dyes was used. The evaluations (a) to (d) in Example 16 were conducted. As a result, the evaluations gave the similar satisfactory results as in Example 16.

EXAMPLE 26

A recording liquid was prepared by the same method as in Example 21, using a combination of 1.5 parts by weight each of the dyes of (IV-1) and (IV-2) specified hereinabove in place of the dye of (IV-3) used in Example 21. The evaluations according to (a) to (d) in Example 16 were conducted. As a result, all the evaluations gave the similar satisfactory results as in Example 16.

EXAMPLE 27

A recording liquid was prepared by the same method as in Example 21, using a combination of 1.5 parts by weight each of the dyes of (IV-2) and (IV-3) specified hereinabove in place of the dye of (IV-3) used in Example 21. The evaluations according to (a) to (d) in Example 16 were conducted. As a result, all the evaluations gave the similar satisfactory results as in Example 16.

EXAMPLE 28

A recording liquid was prepared by the method in Example 21 except that 2-pyrrolidone was used in place of the N-methylpyrrolidone used in Example 21, and evaluations were conducted according to (a) to (d) in Example 16. As a result, all the evaluations gave the similar satisfactory results as in Example 16

EXAMPLES 29 TO 35

The coupling reaction in Example 17 was conducted with, in place of m-methoxyaniline, each of the aniline compounds respectively corresponding to the dyes of (IV-10), (IV-11), (IV-12), (IV-13), (IV-14), (IV-15), and (IV-17) specified hereinabove. Thereafter, hydrolysis, neutralization, filtration, and suspension and washing with isopropanol were conducted in the same manner as in Example 16, followed by drying to synthesize corresponding respective dyes.

EXAMPLE 36

A paste obtained through acid precipitation, filtration, and washing in the same manner as in Example 20 was stirred at ordinary temperature along with 500 ml of water, and the mixture was neutralized to a pH of 8.0 with 20% aqueous triethanolamine solution. This reaction liquid was evaporated to dryness to synthesize a dye (IV-23) which was the triethanolamine salt form of the dye of (IV-1) specified hereinabove.

EXAMPLES 37 TO 39

Dyes Nos. IV-24, IV-25, and IV-26 which were the lithium salt forms of the dyes Nos. IV-2, IV-3, and IV-20 specified hereinabove were respectively synthesized in the same manner as in Example 19.

The maximum absorption wavelengths ($\lambda$max, nm) in aqueous solution of the dyes used in Examples 16 to 39 given above are shown in the following Table 1.

TABLE 1

| Colorant No. | Maximum Absorption Wavelength ($\lambda$max) (nm) |
| --- | --- |
| IV-1 | 599 |
| IV-2 | 600 |
| IV-3 | 603 |
| IV-5 | 596 |
| IV-7 | 582 |
| IV-10 | 578 |
| IV-11 | 604 |
| IV-12 | 592 |
| IV-13 | 591 |
| IV-14 | 608 |
| IV-15 | 600 |
| IV-17 | 585 |
| IV-19 | 601 |
| IV-20 | 601 |
| IV-21 | 599 |
| IV-22 | 599 |
| IV-23 | 599 |
| IV-24 | 600 |
| IV-25 | 601 |
| IV-26 | 601 |

EXAMPLE 40

(i) Synthesis of Compound [E]

18.8 Grams (0.1 mol) of 2,5-diaminobenzenesulfonic acid and 250 ml of water were stirred at ordinary temperature, and 10% aqueous sodium hydroxide solution was added to adjust the pH to 7.5 to dissolve the acid. To this solution was gradually added at ordinary temperature 10.2 g (0.1 mol) of acetic anhydride, and after the addition, the mixture was stirred for 2 hours. To this reaction liquid was added 31 ml of 35% hydrochloric acid. This mixture was cooled to 0° to 5° C., 29 g (0.105 mol) of 25% aqueous sodium nitrite solution was gradually added, and the resulting mixture was stirred at 0° to 5° C. for 2 hours. After the 2 hours, 10% aqueous sulfamic acid solution was added in order to remove the excess sodium nitrite to thereby prepare a first diazo liquid. Separately, a solution obtained by stirring 12.1 g (0.1 mol) of 2,5-xylidine and 100 ml of water at ordinary temperature and adding 8.9 ml of 35% hydrochloric acid to dissolve the compound was cooled to 0° to 5° C. The first diazo liquid described above was added thereto and the pH was adjusted to 3.0 to 4.0 with 10% aqueous sodium hydroxide solution, and the resulting mixture was stirred at 0° to 5° C. for 4 hours. Thereafter, the mixture was filtered and washed with 100 ml of aqueous hydrochloric acid solution having a pH of 1 to synthesize the desired compound [E].

(ii) Synthesis of Compound [F]

A paste of the compound [E] (0.1 mol) obtained in (i) above was stirred along with 1 liter of water at ordinary temperature, and 10% aqueous sodium hydroxide solution was added to adjust the pH to 8.0 to dissolve the compound. To this solution was added 31 ml of 35% hydrochloric acid, and this mixture was cooled to 0° to 5° C. 29 Grams (0.105 mol) of 25% aqueous sodium nitrite solution was gradually added to the mixture, and the resulting mixture was stirred at 0° to 5° C. for 2 hours. After the 2 hours, 10% aqueous sulfamic acid solution was added in order to remove the excess sodium nitrite to thereby prepare a second diazo liquid. Separately, 23.9 g (0.1 mol) of γ-acid was stirred along with 500 ml of water at ordinary temperature, and 10% aqueous sodium hydroxide solution was added to adjust the pH to 12.0 to neutralize the solution and dissolve the acid. This solution was cooled to 0° to 5° C., and the second diazo liquid described above was gradually added, during which the pH was maintained at 11.0 to 12.0 with 10% aqueous sodium hydroxide solution. This solution was stirred at 0° to 5° C. for 2 hours, and the colorant precipitated was filtered and washed with 150 ml of 5% aqueous sodium chloride solution to synthesize compound [F].

(iii) Synthesis of Compound [G-1]

A paste of the compound [F] (0.1 mol) obtained in (ii) above was stirred along with 1 liter of water at ordinary temperature, giving a slurry. To this slurry was added 40 ml of 35% hydrochloric acid, and this mixture was cooled to 0° to 5° C. 29 Grams (0.105 mol) of 25% aqueous sodium nitrite solution was gradually added to the mixture, and the resulting mixture was stirred at 0° to 5° C. for 3 hours. After the 3 hours, 10% aqueous sulfamic acid solution was added in order to remove the excess sodium nitrite to thereby prepare a third diazo liquid. 15.3 Grams (0.1 mol) of 2,5-dimethoxyaniline (corresponding to the compound [C] described hereinabove) was heated to 60° C. along with 100 ml of water and 8.9 ml of 35% hydrochloric acid to dissolve the compound. After this solution was cooled to 0° to 5° C., the third diazo liquid described above was gradually added and the resulting mixture was stirred at 0° to 5° C. for 10 hours to synthesize compound [G-1].

(iv) Synthesis of Dye of (V-1)

To the reaction liquid containing compound [G-1] which had been obtained in (iii) above were added 250 ml of N-methylpyrrolidone and 60 g of sodium hydroxide. The mixture was heated to 60° C. and stirred for 3 hours. This mixture was cooled to room temperature and then neutralized to a pH of 8.0 with 35% hydrochloric acid, and the dye precipitated was filtered and washed with 150 ml of 5% aqueous sodium chloride solution.

A paste of this colorant was stirred along with 750 ml of water at ordinary temperature to redisperse the colorant. Thereto was added 1,500 ml of 2-propanol. The dye precipitated was filtered and washed with 150 ml of 67% aqueous 2-propanol solution, and the paste obtained was dried to obtain the colorant of (V-1) specified hereinabove.

A recording liquid was prepared using the obtained dye of (V-1) in the same manner as in Example 6, and evaluations were conducted by the methods (a) to (b) in Example 16. As a result, the similar satisfactory results were obtained as in Example 16.

EXAMPLE 41

Compound [F] was synthesized in the same manner as in Example 40 and the compound [F] was diazotized. The diazo liquid obtained was subjected to a coupling reaction with m-methoxyaniline, and the subsequent treatment was conducted in the same manner as in Example 40 to synthesize the dye of (V-5) specified hereinabove.

A recording liquid was prepared using this dye in the same manner as in Example 17, and the evaluations according to (a) to (d) in Example 16 were conducted. As a result, all the evaluations gave the similar satisfactory results as in Example 16.

EXAMPLE 42

The dye of (V-7) specified hereinabove was synthesized using 2,5-dimethylaniline in place of m-methoxyaniline in Example 40. A recording liquid was prepared using the obtained dye of (V-7) in the same manner as in Example 3, and the evaluations according to (a) to (d) in Example 16 were conducted. As a result, all the evaluations gave the similar satisfactory results as in Example 16.

EXAMPLES 43 TO 44

Compound [G-1] was synthesized in the same manner as in Example 40 and treated in the same manner as in Example 19 to obtain a dye (V-21) which was the lithium salt form of the structure of (V-1) specified hereinabove.

Further, the dye No. V-1 obtained in Example 41 was used and treated in the same manner as in Example 20 to obtain a dye (V-22) which was the ammonium salt form of the structure No. V-1 specified hereinabove.

The preparation and evaluations of recording liquids were conducted by the same method as in Example 16 except that these dyes of (V-21) and (V-22) were used. As a result, the similar satisfactory results were obtained as in Example 16.

EXAMPLE 45

The dye of (V-3) was obtained in the same manner as in Example 41 except that 2,5-di-n-butoxyaniline was used in place of m-methoxyaniline. A recording liquid was prepared in the same manner as in Example 21 except that this dye (V-3) was used, and the evaluations according to (a) to (d) in Example 16 were conducted. As a result, all the evaluations gave the similar satisfactory results as in Example 16.

EXAMPLE 46

A recording liquid was prepared in the same manner as in Example 45 except that the dye of (V-1) specified hereinabove was used in place of the dye of (V-3), and the evaluations (a) to (d) in Example 16 were conducted. The results were satisfactory as similar to Example 16.

EXAMPLES 47 TO 49

Recording liquids were prepared by the same method as in Example 45 except that 2,5-dimethoxyaniline (corresponding to V-2), 2,5-di-n-propoxyaniline (corresponding to V-19), and 2,5-di-iso-propoxyaniline (corresponding to V-20) were used in place of the m-methoxyaniline in Example 41 to synthesize dyes respectively corresponding thereto, and each of these dyes was used. The evaluations (a) to (d) in Example 16 were conducted. As a result, the results were satisfactory as similar to Example 16.

EXAMPLE 50

A recording liquid was prepared by the same method as in Example 45, using a combination of 1.5 parts by weight each of the colorants of (V-1) and (V-2) in place of the dye (V-3) used in Example 45. The evaluations according to (a) to (d) in Example 16 were conducted. As a result, all the evaluations gave the similar satisfactory results as in Example 16.

EXAMPLE 51

A recording liquid was prepared by the same method as in Example 45, using a combination of 1.5 parts by weight each of the dyes of (V-2) and (V-3) in place of the dye (V-3) used in Example 45. The evaluations according to (a) to (d) in Example 16 were conducted. As a result, all the evaluations gave the similar satisfactory results as in Example 16.

EXAMPLE 52

A recording liquid was prepared by the method in Example 45 except that 2-pyrrolidone was used in place of the N-methylpyrrolidone used in Example 45, and evaluations were conducted according to (a) to (d) in Example 16. As a result, all the evaluations gave the similar satisfactory results as in Example 16.

EXAMPLES 53 TO 59

Compound [F] was synthesized in the same manner as in Example 40 and the compound [F] was diazotized. The diazo liquid obtained was treated in the same manner as in Example 41 except that the diazo liquid was subjected to a coupling reaction with the aniline compounds corresponding to (V-10), (V-11), (V-12), (V-13), (V-14), (V-15), and (V-17) in place of m-methoxyaniline to synthesize respective dyes.

EXAMPLE 60

A paste obtained through acid precipitation, filtration, and washing in the same manner as in the process for producing the dye of (V-22) in Example 44 was treated in the same manner as in Example 36 to synthesize a dye (V-23) which was the triethanolamine salt form of the structure of the dye of (V-1) specified hereinabove.

EXAMPLES 61 TO 63

Dyes (V-24), (V-25), and (V-26) which were the lithium salt forms of the dyes of (V-2), (V-3), and (V-20) specified hereinabove respectively were synthesized in the same manner as in Examples 43 to 44.

The maximum absorption wavelengths ($\lambda$max, nm) in aqueous solution of the colorants synthesized in Examples 40 to 63 given above are shown in the following Table 2.

TABLE 2

| Colorant No. | Maximum Absorption Wavelength ($\lambda$max) (nm) |
|---|---|
| V-1 | 590 |
| V-3 | 592 |
| V-5 | 588 |
| V-7 | 579 |
| V-10 | 575 |
| V-11 | 593 |
| V-12 | 588 |
| V-13 | 574 |
| V-14 | 572 |
| V-15 | 595 |
| V-17 | 585 |
| V-19 | 592 |
| V-20 | 592 |
| V-21 | 590 |
| V-22 | 592 |
| V-23 | 590 |
| V-24 | 590 |
| V-25 | 591 |
| V-26 | 592 |

COMPARATIVE EXAMPLE 1

Recording liquids were prepared and evaluated in the same manner as in Example 16 except that the dyes having the known structures of (1) to (4) shown below were used in place of the dye of IV-1. The results are as shown in Table 3 given below. The recording liquids employing the known dyes had a problem in any of the evaluations, in contrast to the recording liquids of the present invention which were satisfactory in all the evaluations.

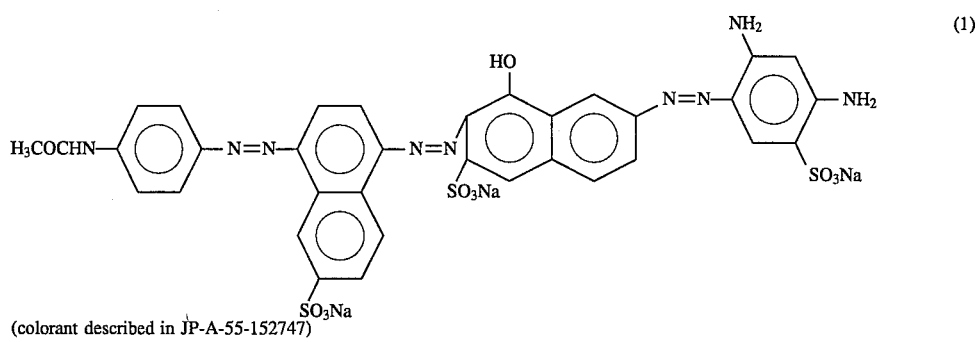

(colorant described in JP-A-55-152747) (1)

-continued

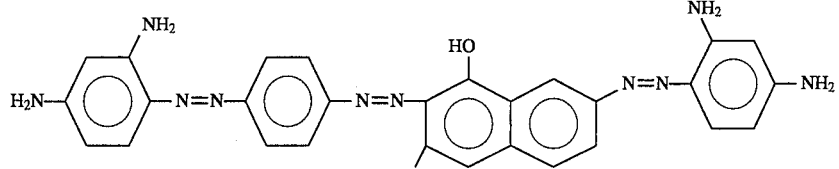

(2)

(colorant described in JP-A-55-144,067)

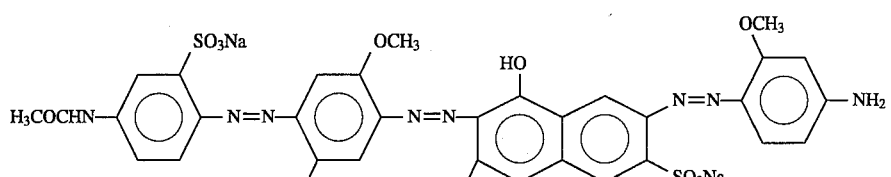

(3)

(colorant described in JP-A-3-200882)

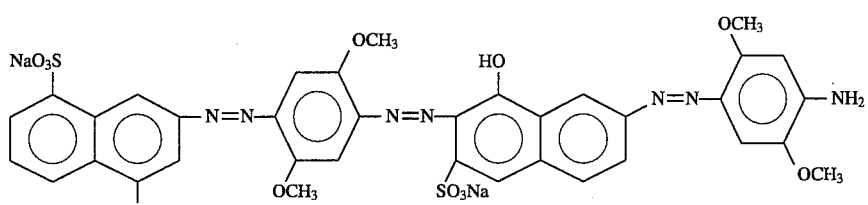

(4)

(colorant described in JP-A-3-200882)

TABLE 3

| Compar-<br>ative<br>Colorant | Recorded Image | | Recording Liquid | |
|---|---|---|---|---|
| | (a) Light<br>resistance | (b) Water<br>resistance | (c) Storage<br>stability | (d) Ejection<br>stability |
| Colorant of (1) | good | white ground stained, with considerable blurring | good | good |
| Colorant of (2) | considerable discoloration and fading | good | insoluble matter precipitated | ejection stopped after 10 hr |
| Colorant of (3) | good | white ground stained, with considerable blurring | good | ejection stopped after 15 hr |
| Colorant of (4) | good | white ground stained, with considerable blurring | good | good |

We claim:

1. A recording liquid comprising an aqueous medium and at least one dye selected from the dyes represented by general Formulae (I) to (VA):

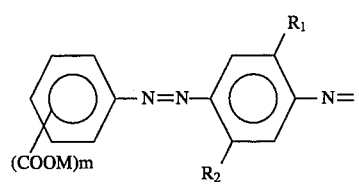

(I)

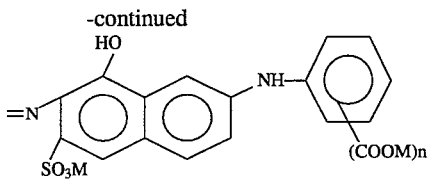

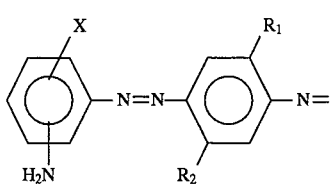

(II)

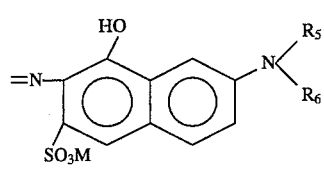

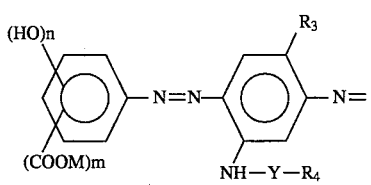

(III)

-continued

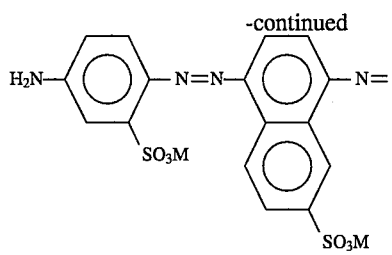

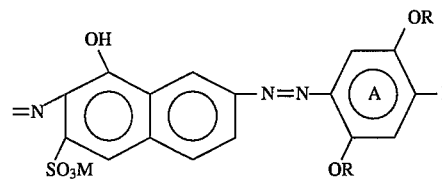 (VA)

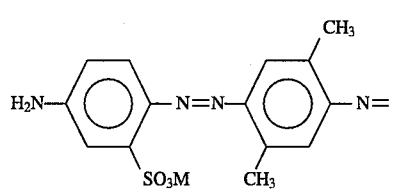

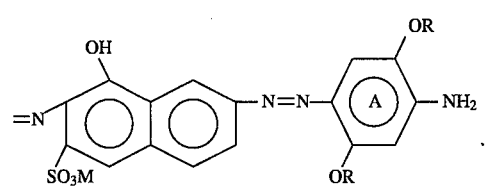

wherein R represents an alkyl group having 1 to 4 carbons, $R_1$ and $R_2$ each represents H, $CH_3$, or $OCH_3$; $R_3$ represents H, Cl, $CH_3$ or $OCH_3$; $R_4$ represents an alkyl group having 1 to 6 carbon atoms, a phenyl group, a tolyl group, or an anisyl group; $R_5$ represents H, a phenyl group which may be substituted with a COOM group, or an alkyl group having 1 to 3 carbon atoms which is substituted with a COOM group; $R_6$ represents H or an alkyl group having 1 to 3 carbon atoms which is substituted with a COOM group; X represents $SO_3M$ or COOM; Y represents —CO— or —$SO_2$—; m represents 1 or 2; n represents 0 or 1; A represents a phenylene group which may have one or more members selected from the group consisting of an alkyl group having 1 to 4 carbon atoms, an alkoxy group having 1 to 4 carbon atoms, an amino group, a —COOM group, a hydroxyl group, an —$SO_3M$ group, and a halogen atom; and M represents an alkali metal, an ammonium group, or an organic amine salt.

2. A recording liquid comprising an aqueous medium and at least one dye selected from the dyes represented by general formula [I]:

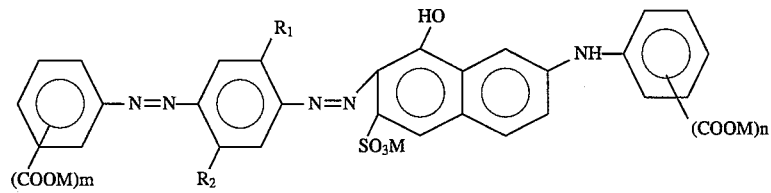

(wherein $R_1$ and $R_2$ each represents H, $CH_3$, or $OCH_3$; M represents an alkali metal, an ammonium salt, or an organic amine salt; m represents 1 or 2; and n represents 0 or 1.

3. A recording liquid characterized by containing an aqueous medium and at least one dye selected from the dyes represented by general formula [II]:

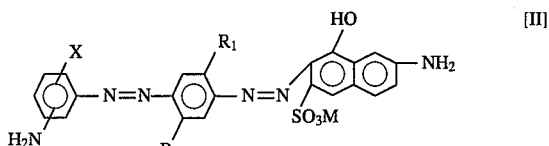

wherein X represents $SO_3M$ or COOM; $R_1$ and $R_2$ each represents H, $CH_3$, or $OCH_3$; and M represents an alkali metal, $NH_4$, or an organic amine salt.

4. A recording liquid comprising an aqueous medium and at least one dye selected from the dyes represented by general formula [III]:

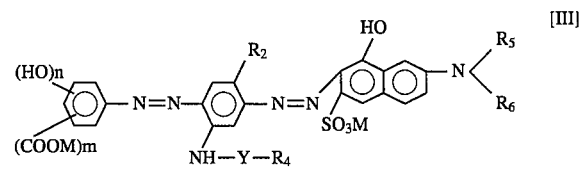

wherein $R_3$ represents H, Cl, $CH_3$, or $OCH_3$; $R_4$ represents an alkyl group having 1 to 6 carbon atoms, a phenyl group, a tolyl group, or an anisyl group; Y represents —CO— or —$SO_2$—; $R_5$ represents H, a phenyl group which may be substituted with a COOM group, or an alkyl group having 1 to 3 carbon atoms which is substituted with a COOM group; $R^6$ represents H or an alkyl group having 1 to 3 carbon atoms which is substituted with a COOM group; m represents 1 or 2; n represents 0 or 1; and M represents an alkali metal, $NH_4$, or an organic amine salt group.

5. A recording liquid comprising an aqueous medium and at least one dye selected from the dyes represented by general Formula (IVA):

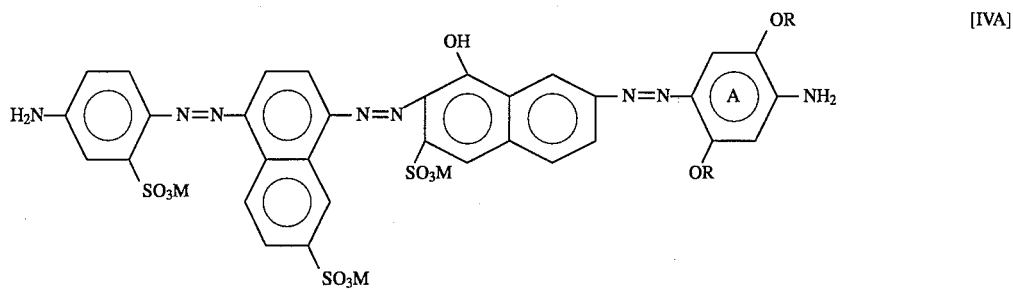

[IVA]

wherein A represents a phenylene group which may have one or more members selected from the group consisting of an alkyl group having 1 to 4 carbon atoms, an alkoxy group having 1 to 4 carbon atoms, an amino group, a —COOM group, a hydroxyl group, an —SO$_3$M group, and a halogen atom; M represents an alkali metal, an ammonium group, or an organic amine salt; and R represents an alkyl group having 1 to 4 carbon atoms.

6. A recording liquid comprising an aqueous medium and at least one dye selected from the dyes represented by general Formula (VA):

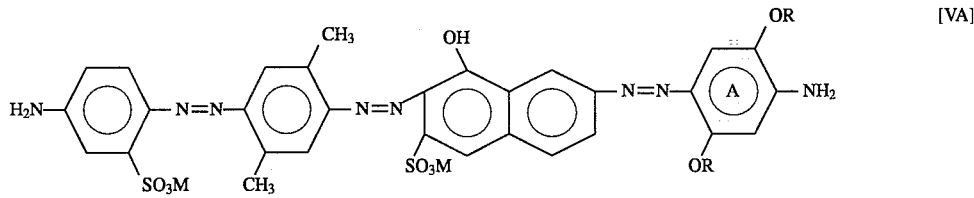

[VA]

wherein A represents a phenylene group which may have one or more members selected from the group consisting of an alkyl group having 1 to 4 carbon atoms, an alkoxy group having 1 to 4 carbon atoms, an amino group, a —COOM group, a hydroxyl group, an —SO$_3$M group, and a halogen atom; M represents an alkali metal, an ammonium group, or an organic amine salt; and R represents an alkyl group having 1 to 4 carbon atoms.

7. A recording liquid according to claim 5, wherein at least two dyes represented by general formula [IVA] are employed.

8. A recording liquid according to claim 6, comprising at least two dyes represented by general formula [VA] are employed.

9. A recording liquid according to claim 1, wherein the dye represented by general formulae [I] to [VA] is contained in an amount of 0.5 to 5% by weight based on the total weight of the recording liquid.

10. A recording liquid according to claim 1, wherein the aqueous medium comprises water and a water-soluble organic solvent selected from the group consisting of ethylene glycol, propylene glycol, butylene glycol, diethylene glycol, triethylene glycol, polyethylene glycol (#200), polyethylene glycol (#400), glycerol, N-methyl-pyrrolidone, N-ethyl-pyrrolidone, 2-pyrrolidone, 1,3-dimethyl-imidazolidinone, ethylene glycol monoallyl ether, ethylene glycol monomethyl ether, diethylene glycol monomethyl ether, dimethyl sulfoxide, and thiodiglycol.

11. A recording liquid according to claim 10, wherein the content of water is in the range of 45 to 93% by weight and the content of the water-soluble organic solvent is 5 to 50% by weight, based on the total amount of the recording liquid.

12. A recording liquid according to claim 5 further comprising at least 2 to 5% by weight of a dye represented by general Formula (IVA), 5 to 20% by weight of a glycol solvent, and 2 to 10% by weight of N-methylpyrrolidone or 2-pyrrolidone.

13. A recording liquid according to claim 6 further comprising at least 2 to 5% by weight of a dye represented by general Formula (VA), 5 to 20% by weight of a glycol solvent, and 2 to 10% by weight of N-methylpyrrolidone or 2-pyrrolidone.

14. A recording liquid according to claim 1 further comprising at least one of (a) 0.1 to 10% by weight of a compound selected from the group consisting of urea, thiourea, biuret, and semicarbazide; and (b) 0.001 to 5.0% by weight of a surfactant.

15. A colorant represented by general Formula (IVA):

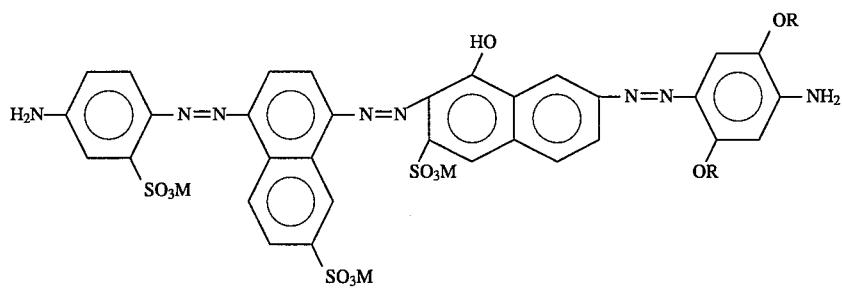
[IVA]
wherein R represents an alkyl group having 1 to 4 carbon atoms; and M represents an alkali metal, an ammonium group, or an organic amine salt.
16. A colorant represented by general Formula (VA):
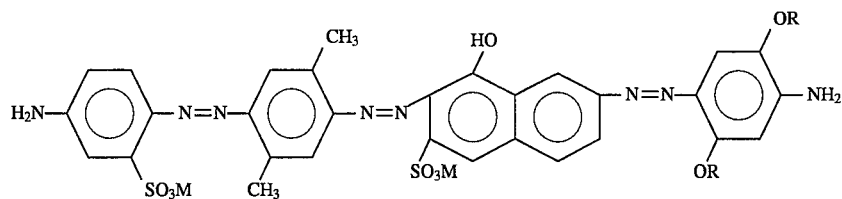
[VA]
wherein R represents an alkyl group having 1 to 4 carbon atoms; and M represents an alkali metal, an ammonium group, or an organic amine salt.
* * * * *

UNITED STATES PATENT AND TRADEMARK OFFICE
CERTIFICATE OF CORRECTION

PATENT NO. : 5,478,384
DATED : December 26, 1995
INVENTOR(S) : Hiroshi Takimoto, et al It is certified that error appears in the above-indentified patent and that said Letters Patent is hereby corrected as shown below:

Title page, item [30], FOREIGN APPLICATION PRIORITY DATA
insert-- September 29, 1992 [PCT] Japan.................92/01247 --; and In column 32, line 25, in formula (III), change "R " to --R --.

Signed and Sealed this

Sixteenth Day of April, 1996

*Attest:*

BRUCE LEHMAN

*Attesting Officer* . *Commissioner of Patents and Trademarks*

UNITED STATES PATENT AND TRADEMARK OFFICE
CERTIFICATE OF CORRECTION

PATENT NO. : 5,478,384
DATED : December 26, 1995
INVENTOR(S) : Hiroshi Takimoto, et. al.

It is certified that error appears in the above-identified patent and that said Letters Patent is hereby corrected as shown below:

Title page, item [30], FOREIGN APPLICATION PRIORITY DATA
insert-- September 29, 1992 [PCT] Japan.................92/01247 --; and In column 32, line 25, in formula (III), change "$R_2$" to --$R_3$--.

This certificate supersedes Certificate of Correction issued April 16, 1996.

Signed and Sealed this

Fourth Day of June, 1996

Attest:

BRUCE LEHMAN

*Attesting Officer*     *Commissioner of Patents and Trademarks*